(12) United States Patent
Kasazumi et al.

(10) Patent No.: US 7,271,962 B2
(45) Date of Patent: Sep. 18, 2007

(54) TWO-DIMENSIONAL IMAGE FORMATION APPARATUS

(75) Inventors: Ken'ichi Kasazumi, Takatsuki (JP); Kiminori Mizuuchi, Neyagawa (JP); Kazuhisa Yamamoto, Takatsuki (JP)

(73) Assignee: Matsushita Electric industrial Co., Ltd., Osaka (JP)

( * ) Notice: Subject to any disclaimer, the term of this patent is extended or adjusted under 35 U.S.C. 154(b) by 0 days.

(21) Appl. No.: 10/565,390

(22) PCT Filed: Jul. 22, 2004

(86) PCT No.: PCT/JP2004/010746

§ 371 (c)(1),
(2), (4) Date: Jan. 23, 2006

(87) PCT Pub. No.: WO2005/008330

PCT Pub. Date: Jan. 27, 2005

(65) Prior Publication Data

US 2006/0227293 A1 Oct. 12, 2006

(30) Foreign Application Priority Data

Jul. 22, 2003 (JP) ............................. 2003-277378

(51) Int. Cl.
*G02B 13/20* (2006.01)

(52) U.S. Cl. ..................... 359/707; 359/641; 359/642; 359/738; 359/237

(58) Field of Classification Search ................ 359/707, 359/641, 642, 738, 237
See application file for complete search history.

(56) References Cited

U.S. PATENT DOCUMENTS 3,754,814 A   8/1973   Leith
4,155,630 A   5/1979   Ih
5,807,440 A * 9/1998   Kubota et al. ............... 136/256
6,577,429 B1  6/2003   Kurtz et al. ................. 359/279
6,594,090 B2  7/2003   Kruschwitz et al. ......... 359/707
2003/0039036 A1* 2/2003  Kruschwitz et al. ......... 359/707

FOREIGN PATENT DOCUMENTS

| EP | 0589179 A1 | 3/1994 |
| EP | 1292134 A2 | 3/2003 |
| GB | 1252621 | 11/1971 |
| JP | 53149343 | 12/1978 |
| JP | 07-297111 | 11/1995 |
| JP | 2594319 | 12/1996 |
| JP | 2000330210 | 11/2000 |
| JP | 2001-100316 | 4/2001 |

* cited by examiner

*Primary Examiner*—Scott J. Sugarman
*Assistant Examiner*—James R Greece
(74) *Attorney, Agent, or Firm*—Steptoe & Johnson LLP

(57) ABSTRACT

A two-dimensional image formation apparatus according to the present invention is provided with laser sources ($1a$)~($1c$), diffusers ($6a$)~($6c$) for diffusing light, illumination optical systems for irradiating the diffusers ($6a$)~($6c$) with lights emitted from the laser sources ($1a$)~($1c$), diffuser vibration units ($13a$)~($13c$) for vibrating the diffusers ($6a$)~($6c$), and spatial light modulators ($7a$)~($7c$) disposed near the diffusers ($6a$)~($6c$), for modulating the lights emitted from the laser sources ($1a$)~($1c$) and diffused by the diffusers ($6a$)~($6c$), wherein the diffusers ($6a$)~($6c$) are vibrated by the diffuser vibration units ($13a$)~($13c$) at a velocity that satisfies a relationship, $V > d \times 30$ (millimeters/sec), which is established between the grain size d of the diffusers and the vibration speed V of the diffusers, whereby speckle noise existing in an image projected on a screen (11) can be effectively reduced.

13 Claims, 7 Drawing Sheets

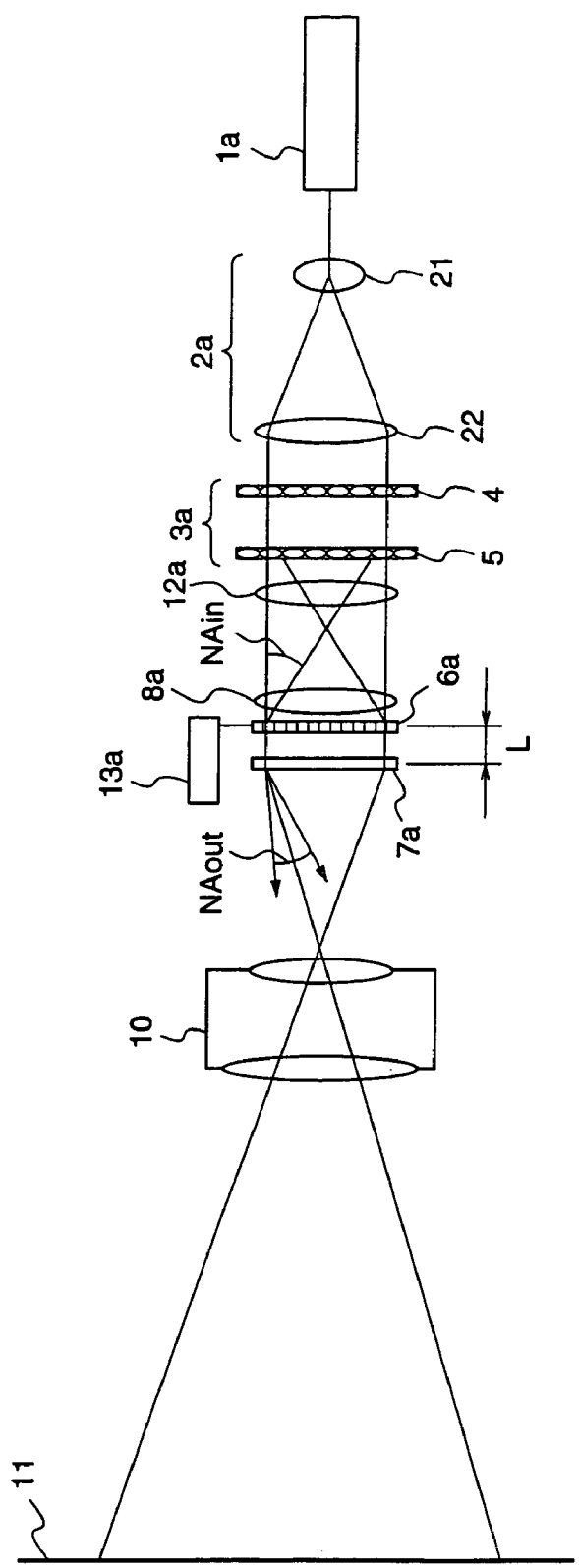
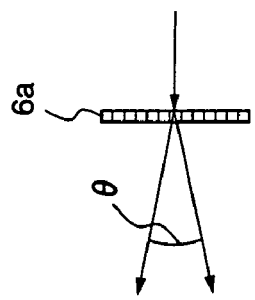
Fig.3(a)
Fig.3(b)

TWO-DIMENSIONAL IMAGE FORMATION APPARATUS

The present application is based on International Application PCT/JP2004/010746, filed Jul. 22, 2004, which application is incorporated herein by reference in its entirety.

TECHNICAL FIELD

The present invention relates to a two-dimensional image formation apparatus and, more particularly, to an image display apparatus such as a television receiver or a video projector, or an image formation apparatus such as a semiconductor exposure device.

BACKGROUND ART

FIG. 7 is a diagram illustrating the schematic structure of a conventional laser display.

This laser display 100 includes laser sources 101a~101c corresponding to RGB primary colors and light modulators 106a~106c for subjecting laser beams La~Lc outputted from the laser sources 101a~101c to intensity modulation according to primary color signals Sa~Sc of an input video signal. The laser display 100 further includes a mirror 103 for reflecting the laser beam La modulated by the light modulator 106a, a dichroic mirror 102a for multiplexing the laser beam Lb modulated by the light modulator 106b and the laser beam La reflected at the mirror 103, and a dichroic mirror 102b for multiplexing the laser beam Lb modulated by the light modulator 106b and the laser beam outputted from the dichroic mirror 102a. Further, the laser display 100 includes a condenser lens 107 for condensing the laser beam that is obtained by the dichroic mirror 102b, a polygon scanner 104 for scanning the laser beam condensed by the condenser lens 107 in the x direction, and a galvanometer scanner 105 for scanning the light outputted from the polygon scanner 104 in the y direction so as to form a two-dimensional image on a screen 108.

Next, the operation will be described.

The laser beams La~Lc emitted from the laser sources 101a~101c corresponding to the RGB primary colors are subjected to intensity modulation by the light modulators 106a~106c according to the respective primary color signals Sa~Sc of the input video signal, respectively, and are multiplexed by the optical system comprising the mirror 103 and the dichroic mirrors 102a and 102b. Further, the laser beam condensed by the condenser lens 107 is scanned in the x direction by the polygon scanner 104 and in the y direction by the galvanometer scanner 105, whereby a two-dimensional image is displayed on the screen 108.

As described above, in the conventional laser display 100, since the light beams emitted from the RGB laser light sources 101a~101c are monochromatic light beams, respectively, a bright image having a high color purity can be displayed by using the laser sources of appropriate wavelengths.

By the way, in the conventional laser display, since the laser sources which output high-coherent light beams are used as light sources, so-called speckle noise might occur. This speckle noise is a minute noise that occurs, when the laser beams are scattered on the screen 108, due to interference of the light beams which are scattered at the respective positions on the screen 108.

A method for removing such speckle noise is described in, for example, Japanese Published Patent Application No. Hei.7-297111. This literature describes a method of removing the above-mentioned speckle noise by rotating a diffuser which is disposed on an optical path of a condenser optical system.

However, a mechanism for rotating the diffuser causes an increase in the device scale. Further, loss of the light scattered by the diffuser causes a reduction in the brightness of the image displayed on the screen.

The present invention is made to solve the above-described problems and has for its object to provide a two-dimensional image formation apparatus which can prevent, using a diffuser, deterioration of an image due to speckle noise without increasing the device scale very much, and can perform bright image display by effectively reducing the loss of light that is scattered by the diffuser.

DISCLOSURE OF THE INVENTION

A two-dimensional image formation apparatus defined in Claim 1 of the present invention is an apparatus for forming a two-dimensional image by light modulation, and comprises a coherent light source; a diffuser for diffusing light; an illumination optical system for irradiating the diffuser with light emitted from the coherent light source; a diffuser vibration unit for vibrating the diffuser; and a spatial light modulator disposed near the diffuser, the modulator modulating the light that is emitted from the coherent light source and diffused by the diffuser; wherein the diffuser vibration unit vibrates the diffuser at a velocity that satisfies an expression, V>d×30 (millimeters/sec), which is established between the grain size d of the diffuser and the velocity V for vibrating the diffuser.

Therefore, speckle noises existing in an image projected onto a screen can be reduced, resulting in high-quality image display.

Further, a two-dimensional image formation apparatus defined in Claim 2 of the present invention is an apparatus for forming a two-dimensional image by light modulation, and comprises a coherent light source; a diffuser for diffusing light; an illumination optical system for irradiating the diffuser with light emitted from the coherent light source; a spatial light modulator disposed near the diffuser, the modulator modulating the light that is emitted from the coherent light source and diffused by the diffuser; and a projector lens for projecting an image which is obtained by light modulation by the spatial light modulator, on a certain plane in space; wherein a diffusion angle of the diffuser is determined on the basis of a substantial numerical aperture of the illumination optical system, and a brightness of the projector lens.

Therefore, an appropriate relationship is made among the diffusion angle of the diffuser, the substantial numerical aperture of the illumination optical system, and the brightness of the projector lens, whereby loss of light quantity due to vignetting caused by the projector lens is dissolved, resulting in bright image display.

Further, according to Claim 3 of the present invention, in the two-dimensional image formation apparatus defined in Claim 2, a relationship, $\theta/2 + \mathrm{Sin}^{-1}(\mathrm{NAin}) < 2 \times \mathrm{Tan}^{-1}(1/2f)$, is established among the diffusion angle $\theta$ of the diffuser, the substantial numerical aperture NAin of the illumination optical system, and the brightness f of the projector lens.

Therefore, loss of light quantity due to vignetting caused by the projector lens is avoided, resulting in bright image display.

Further, a two-dimensional image formation apparatus defined in Claim 4 of the present invention is an apparatus for forming a two-dimensional image by light modulation, and comprises a coherent light source; a diffuser for diffusing light; an illumination optical system for irradiating the diffuser with light emitted from the coherent light source; a spatial light modulator disposed near the diffuser, the modulator modulating the light that is emitted from the coherent light source and diffused by the diffuser; and a projector lens for projecting an image that is obtained by light modulation by the spatial light modulator, on a certain plane in space; wherein the spatial light modulator and the diffuser are separated from each other by a distance that is determined on the basis of a diffusion angle of the diffuser, a substantial numerical aperture of the illumination optical system, and a screen size of the spatial light modulator in a diagonal direction.

Therefore, an appropriate relationship is made among the diffusion angle of the diffuser, the substantial numerical aperture of the illumination optical system, and the screen size of the spatial light modulator in the diagonal direction, whereby the light is prevented from being scattered by the diffuser to the outside of the image display part of the spatial light modulator, resulting in a reduction in loss of total light quantity in a light transmission path from the coherent light source to the screen.

Further, according to Claim 5 of the present invention, in the two-dimensional image formation apparatus defined in Claim 4, a relationship, $(\theta/2 + \sin^{-1}(NAin)) \times L < D/3$, is established among the diffusion angle $\theta$ of the diffuser, the substantial numerical aperture $NAin$ of the illumination optical system, the distance $L$ between the spatial light modulator and the diffuser, and the screen size $D$ of the spatial light modulator in the diagonal direction.

Therefore, it is possible to reduce loss of total light quantity in the light transmission path from the coherent light source to the screen.

Further, a two-dimensional image formation apparatus defined in Claim 6 of the present invention is an apparatus for forming a two-dimensional image by light modulation, and comprises a coherent light source; a diffuser for diffusing light; an illumination optical system for irradiating the diffuser with light emitted from the coherent light source; a spatial light modulator disposed near the diffuser, the modulator modulating the light that is emitted from the coherent light source and diffused by the diffuser; and a projector lens for projecting an image of the spatial light modulator on a certain plane in space; wherein the spatial light modulator and the diffuser are separated from each other by a distance that is determined on the basis of the pitch of unevenness in the transmissivity of the diffuser, and a substantial numerical aperture of the illumination optical system.

Therefore, an appropriate relationship is made among the diffusion angle of the diffuser, the pitch of unevenness in the transmissivity of the diffuser, the substantial numerical aperture of the illumination optical system, and the distance between the diffuser and the spatial light modulator, whereby degradation of the image due to local unevenness in the transmissivity of the diffuser is prevented, resulting in high-quality image display.

Further, according to Claim 7 of the present invention, in the two-dimensional image formation apparatus according to Claim 6, a relationship, $L \times NAin > P$, is established among the pitch $P$ of unevenness in the transmissivity of the diffuser, the substantial numerical aperture $NAin$ of the illumination optical system, and the distance $L$ between the spatial light modulator and the diffuser.

Therefore, degradation of the image due to local unevenness in the transmissivity of the diffuser is prevented, resulting in high-quality image display.

Further, according to Claim 8 of the present invention, in the two-dimensional image formation apparatus defined in any of Claims 1 to 7, the illumination optical system includes a light integrator.

Therefore, uniform illumination on the spatial light modulator can be realized.

Further, according to Claim 9 of the present invention, in the two-dimensional image formation apparatus defined in Claim 8, the light integrator comprises at least two lens arrays.

Therefore, unevenness of contrast can be eliminated.

Further, according to Claim 10 of the present invention, in the two-dimensional image formation apparatus defined in Claim 8, the light integrator comprises a rod type light integrator.

Therefore, uniform illumination on the spatial light modulator can be realized by the simple construction.

Further, according to Claim 11 of the present invention, in the two-dimensional image formation apparatus defined in any of Claims 1 to 7, the diffuser comprises a pseudo random diffuser having a surface which is processed so as to obtain a desired diffusion angle.

Therefore, uniform diffusion angle and uniform transmissivity can be realized, resulting in brighter image display with less noise.

Further, according to Claim 12 of the present invention, in the two-dimensional image formation apparatus defined in Claim 11, the pseudo random diffuser is obtained by partitioning a surface of a transparent substrate in a lattice pattern to provide plural cell areas, and processing the cell areas so that adjacent cell areas have different heights.

Therefore, the diffusion angle of the light passing through the diffuser can be exactly controlled by the sizes of the cells, whereby the light use efficiently is improved.

Further, according to Claim 13 of the present invention, in the two-dimensional image formation apparatus defined in Claim 12, in the pseudo random diffuser obtained by processing a transparent substrate, a difference in heights between adjacent cell areas is set so that the phases of light beam passing through these cell areas are shifted by $\pi/4$ from each other.

Therefore, a diffuser having a constant diffusion angle can be fabricated, whereby the light use efficiency is improved.

Further, according to Claim 14 of the present invention, in the two-dimensional image formation apparatus defined in Claim 11, the pseudo random diffuser has a concave-convex surface configuration in which the level of the surface thereof varies continuously.

Therefore, it is possible to avoid occurrence of a high-order diffracted light which is scattered at a large angle that is caused by a difference in levels between adjacent concave and convex at the surface of the diffuser, whereby loss of the light quantity due to vignetting caused by the projector lens is dissolved, thereby to improve the light use efficiency.

BRIEF DESCRIPTION OF THE DRAWINGS

FIG. 3(*a*) is a diagram illustrating a numerical aperture of illumination light, a numerical aperture of emission light from a spatial light modulator, and a distance between a diffuser and the spatial light modulator, in the two-dimensional image formation apparatus according to the first embodiment.

FIG. 3(b) is a diagram illustrating a diffusion angle of a diffuser in the two-dimensional image formation apparatus according to the first embodiment.

BEST MODE TO EXECUTE THE INVENTION

Hereinafter, embodiments of the present invention will be described with reference to the drawings.

EMBODIMENT 1

Figure 1:
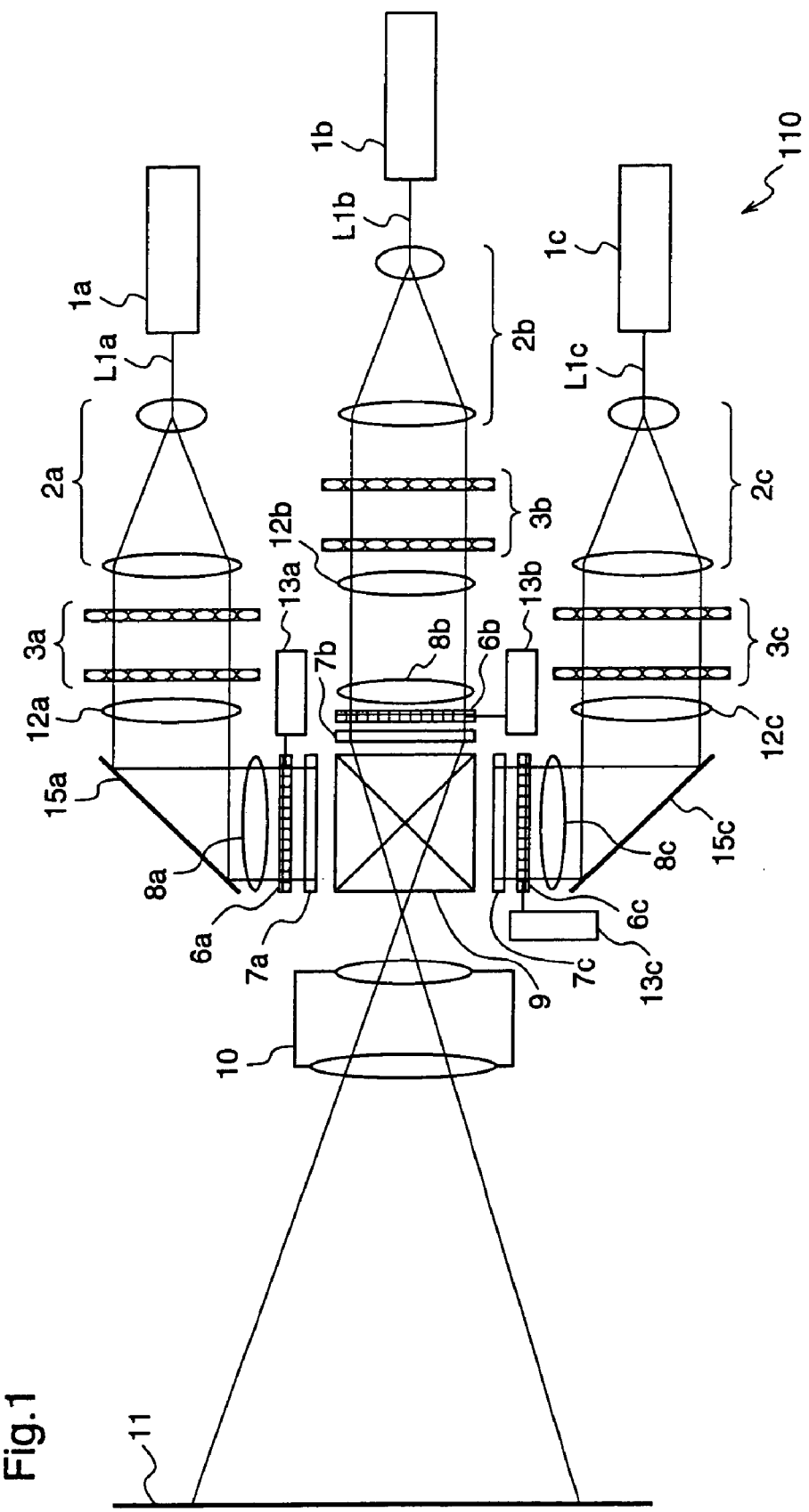
FIG. 1 is a diagram for explaining a two-dimensional image formation apparatus according to a first embodiment of the present invention.

FIG. 1 is a schematic block diagram for explaining a two-dimensional image formation apparatus according to a first embodiment of the present invention.

The two-dimensional image formation apparatus 110 shown in FIG. 1 includes laser sources 1a~1c as coherent light sources corresponding to primary color signals of RGB primary colors, diffusers 6a~6c for diffusing light beams, and illumination optical systems for irradiating the diffusers 6a~6c with laser beams L1a~L1c outputted from the laser sources 1a~1c, respectively. Further, the two-dimensional image formation apparatus 110 includes diffuser vibration units 13a~13c for vibrating the respective diffusers 6a~6c, spatial light modulators 7a~7c for modulating the light beams that are emitted from the laser sources 1a~1c and diffused by the diffusers 6a~6c, which modulators 7a~7c are constituted by liquid crystal panels or the like, a dichroic prism 9 for multiplexing the light beams that have passed through the spatial light modulators 7a~7c, and a projector lens 10 for projecting the light beam multiplexed by the dichroic prism 9 on a screen 11.

The laser source 1a is a red laser source for outputting a red laser beam L1a, the laser source 1b is a green laser source for outputting a green laser beam L1b, and the laser source 1c is a blue laser source for outputting a blue laser beam L1c. There may be employed, as the laser sources 1a~1c, a gas laser such as a He—Ne laser, a He—Cd laser, or a Ar laser, a AlGaInP or GaN semiconductor laser, or a SHG (Second Harmonic Generation) laser using output light from a solid laser as a fundamental wave.

The illumination optical system corresponding to the red laser source 1a includes a beam expander 2a for expanding the light emitted from the laser source 1a, and a light integrator 3a for two-dimensionally separating the light expanded by the beam expander 2a to expandingly project the light. Further, this optical system includes a condenser lens 12a for condensing the light that is expanded and projected by the light integrator 3a, a mirror 15a for reflecting the condensed light, and a field lens 8a for converting the reflected light from the mirror 15a and irradiating the diffuser 6a with the converted light. The field lens 8a converts the light incident on the spatial light modulator 7a through the diffuser 6a into a convergent beam so that the light efficiently passes through the aperture of the projector lens 10.

The illumination optical system corresponding to the green laser source 1b includes a beam expander 2b for expanding the light emitted from the laser source 1b, and a light integrator 3b for two-dimensionally separating the light expanded by the beam expander 2b to expandingly project the light. Further, this optical system includes a condenser lens 12b for condensing the light that is expanded and projected by the light integrator 3b, and a field lens 8b for converting the condensed light and irradiating the diffuser 6b with the converted light. The field lens 8b converts the light incident on the spatial light modulator 7b through the diffuser 6b into a convergent beam so that the light efficiently passes through the aperture of the projector lens 10.

The illumination optical system corresponding to the blue laser source 1c includes a beam expander 2c for expanding the light emitted from the laser source 1c, and a light integrator 3c for two-dimensionally separating the light expanded by the beam expander 2c to expandingly project the light. Further, this optical system includes a condenser lens 12b for condensing the light that is expanded and projected by the light integrator 3c, a mirror 15c for reflecting the condensed light, and a field lens 8c for converting the reflected light from the mirror 15c and irradiating the diffuser 6c with the converted light. The field lens 8c converts the light incident on the spatial light modulator 7c through the diffuser 6c into a convergent beam so that the light efficiently passes through the aperture of the projector lens 10.

Next, a description will be given of the principle of the illumination optical system corresponding to the red laser source 1a.

Figure 2:
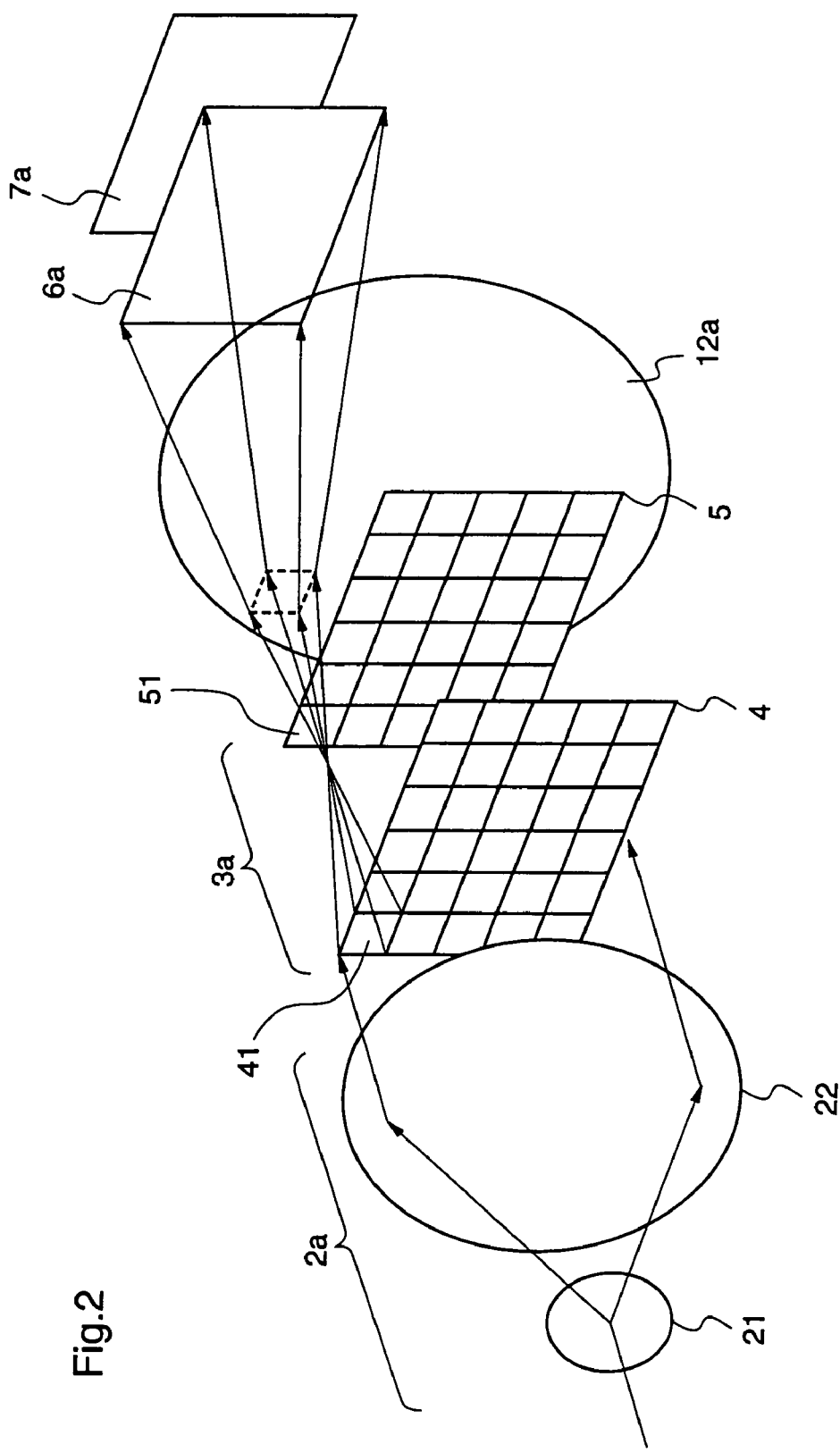
FIG. 2 is a diagram for explaining an illumination optical system in the two-dimensional image formation apparatus according to the first embodiment.

FIG. 2 is a schematic diagram simplistically illustrating the illumination optical system corresponding to the red laser source 1a, in the two-dimensional image formation apparatus shown in FIG. 1. In FIG. 2, the same reference numerals as those shown in FIG. 1 designate the same parts, and the illumination optical system corresponding to the green laser source 1b and the illumination optical system corresponding to the blue laser source 1c have the same constructions as that of the illumination optical system corresponding to the red laser source 1a.

The beam expander 2a comprises a magnifying lens 21 on which a light beam from the light source is applied, and a collimator lens 22 for converting the light emitted from the magnifying lens 21 into a parallel beam.

The light integrator optical system 3a comprises two pieces of two-dimensional lens arrays 4 and 5. The lens array 4 comprises plural element lenses 41 which are arranged in matrix, and the lens array 5 comprises plural element lenses 51 which are arranged in matrix. The respective elements lenses of the lens arrays 4 and 5 are arranged such that all the images of the element lenses 41 on the light source side are focused on the spatial light modulator 7a, by the element lenses 51 on the spatial light modulator side. The collimated light from the collimator lens 22 is distributed so as to be bright in the vicinity of the center on the lens array 4 and dark on the periphery of the lens array 4. The lens arrays 4 and 5 cut off the light applied onto the lens array 4 by the respective element lenses 41 corresponding to the minute areas of the lens array 4, and superimpose all of the light beams cut off by the element lenses 41 on the spatial light modulator 7a, thereby uniformalizing the light intensity distribution on the spatial light modulator 7.

Further, the diffuser vibration unit 13a vibrates the diffuser 6a so as to reduce the speckle noise existing in the image that is projected onto the screen, and it can effectively reduce the speckle noise by providing operating conditions or the like for vibrating the diffuser 6.

Next, the operation will be described.

The light beams L1a~L1c emitted from the red laser source 1a, the green laser source 1b, and the blue laser source 1c are incident on the diffusers 6a~6c through the corresponding illumination optical systems to be diffused by the diffusers 6a~6c, respectively. The spatial light modulator 7a~7c disposed adjacent to the respective diffusers 6a~6c are irradiated with the laser beams diffused by the diffusers 6a~6c, and two-dimensional images are formed on the respective spatial light modulators 7a~7c. The light beams that have passed through the spatial light modulators 7a~7c are multiplexed by the dichroic prism 9, and the multiplexed light is projected onto the screen 11 by the projector lens 10.

In the illumination optical system corresponding to the red laser source 1a, the light beam from the laser source 1a is expanded by the beam expander 2a, and the expanded light is two-dimensionally divided by the light integrator 3a to be expandingly projected. Further, in the illumination optical system, the light expanded and projected by the light integrator 3a is condensed by the condenser lens 12a, and enters the diffuser 6a through the mirror 15a and the field lens 8a. At this time, the field lens 8a converts the light incident on the spatial light modulator 7a through the diffuser into a convergence beam so that the light is efficiently transmitted through the aperture of the projector lens 10.

In the illumination optical system corresponding to the green laser source 1b, the light condensed by the condenser lens 12b is directly incident on the field lens 8a, in contrast to the illumination optical system corresponding to the red laser source 1a. In the illumination optical system corresponding to the blue laser source 1c, the light outputted from the laser source 1c is led to the diffuser 6c, in the same manner as described for the illumination optical system corresponding to the red laser source 1a.

Further, the diffuser vibration units 13a~13c vibrate the corresponding diffusers 6a~6c, that is, unidirectionally reciprocate the diffusers 6a~6c, under the state where the modulated laser beam is projected on the screen.

Hereinafter, the operating conditions of the diffusers will be described with reference to FIG. 3.

FIG. 3(a) is a diagram showing an illumination optical system corresponding to the red laser source 1a in the two-dimensional image formation apparatus 110 according to the first embodiment, for explaining a numerical aperture NAin of the illumination optical system, a numerical aperture NAout of the emitted light from the spatial light modulator 7a, and a distance L between the diffuser 6a and the spatial light modulator 7a. FIG. 3(b) is a diagram illustrating a diffusion angle θ of the diffuser 6a. In these figures, the same reference numerals as those shown in FIG. 1 denote the same elements. Further, the operating conditions of the diffusers in the illumination optical systems corresponding to the green laser source 1b and the blue laser source 1c are identical to that of the illumination optical system corresponding to the red laser source 1a.

Initially, the vibration velocities of the diffusers 6a~6c will be described.

When the light that has passed through the diffuser 6a is applied onto the spatial light modulator 7a, a speckle pattern according to the granularity of the diffuser 6a is formed on the spatial light modulator 7a. The speckle noise is reduced by vibrating the diffuser 6a using the diffuser vibration unit 13a. That is, vibration of the diffuser 6a makes the speckle pattern move in parallel to the spatial light modulator 7a, whereby the speckles in the observed image are averaged. At this time, the vibration velocity of the diffuser 6a is defined on the basis of the granularity thereof. To be specific, the vibration velocity of the diffuser 6a is a velocity at which movement by the grain size d that depends on the granularity of the diffuser 6a, e.g., a distance d between a peak and a peak or between a trough and a trough in the random surface configuration of the diffuser 6a, can be carried out within the afterimage time (about 1/30 sec) which is a feature of human eyes. Accordingly, the vibration velocity V (millimeter/sec) of the diffuser 6a should satisfy a condition, $$V > d \times 30 \tag{1}$$

More specifically, since the ordinary diffuser 6a has such granularity that the grain size is within a range from 5 micrometers to 100 micrometers, the vibration velocity of the diffuser 6a should be within a range from several hundreds of micrometers per sec to several millimeters per sec.

The vibration velocities of the diffusers 6b and 6c are set in the same manner as described for the vibration velocity of the diffuser 6a.

Next, the diffusion angles of the diffusers 6a~6c will be described.

The diffusion angle θ of the diffuser 6a is restricted by the f value of the projector lens 10. That is, a light beam that is incident on the projector lens 10 at an angle exceeding 1/f radian with respect to the f value of the projector lens 10 is shielded by the projector lens 10. Therefore, in order to secure the light use efficiency sufficiently, the numerical aperture NAout of the emitted light from the spatial light modulator 7a must be set at 1/f or smaller. That is, a relationship, $$\theta/2 + \mathrm{Sin}^{-1}(NAin) < 2 \times \mathrm{Tan}^{-1}(1/2f) \tag{2}$$

is established among the diffusion angle θ of the diffuser 6a, the substantial numerical aperture NAin of the illumination optical system including the light integrator 3a, and the brightness f of the projector lens 10. In formula (2), the diffusion angle θ is defined by an angle (total angle) at which the intensity of an emission light obtained when a parallel light beam is incident on the diffuser becomes ½ of the center intensity.

For example, when using the diffuser having the diffusion angle θ (θ=10°) and the light integrator having the numerical aperture NAin (NAin=0.1), the f value of the projector lens 10 may be about 5.

To be brief, the following formula (2a) is obtained by modifying the above-mentioned formula (2).

$$(2 \times \mathrm{Tan}((\theta/2 + \mathrm{Sin}^{-1}(NAin))/2))^{-1} > f \tag{2a}$$

When substituting "10" for the variable θ and "0.1" for the NAin on the left-hand side of formula (2a), $$(2\times\tan((5°+\sin^{-1}(0.1))/2))^{-1}=5.7$$

is obtained. Accordingly, the relationship indicated by formula (2) is satisfied when the brightness f of the projector lens 10 is about 5.

The diffusion angles of the diffusers 6b and 6c are set in like manner as described for the diffusion angle of the diffuser 6a.

In order to effectively use the diffuser 6a, it is necessary to define a distance between the diffuser 6a and the spatial light modulator 7a, in addition to the vibration velocity and diffusion angle of the diffuser 6a as described above. When the distance between the spatial light modulator 7a and the diffuser 6a is increased, portion of the light scattered by the diffuser 6a reaches the outside of the image display part of the spatial light modulator 7a, resulting in loss of total light quantity. In order to suppress the loss of light quantity to a predetermined value or lower, the distance L between the diffuser 6a and the spatial light modulator 7a should be set so that a relationship, $$(\theta/2+NAin)\times L<D/3 \quad (3)$$

is established among the diffusion angle θ of the diffuser 6a, the substantial numerical aperture NAin of the illumination optical system including the light integrator 3a, the distance L between the diffuser 6a and the spatial light modulator 7a, and the length D of the diagonal line of the image display range of the spatial light modulator 7a.

Further, when using, as the diffuser 6a, a diffuser having a random concave-convex pattern at its surface, the local diffusion angle and transmissivity differ according to location on the diffuser 6a. Therefore, when the diffuser 6a is located near the spatial light modulator 7a, the distribution of light intensity on the spatial light modulator 7a also varies due to the uneven distribution of transmissivity, whereby a motion of luminosity unevenness according to the motion of the diffuser 6a appears on the screen, and this is superimposed on the image. In order to avoid this, the diffuser 6a should be disposed a predetermined distance or more apart from the spatial light modulator 7a. Since the light beams from the respective element lenses of the lens array 5 constituting the light integrator 3a are incident on the diffuser 6a in different directions, the luminosity irregularities due to the light beams from the respective element lenses, which are diffused by the diffuser 6a, are averaged by taking a sufficient distance L between the diffuser 6a and the spatial light modulator 7a. That is, the distance L between the diffuser 6a and the spatial light modulator 7a should be set so that a relationship, $$L>P/NAin \quad (4)$$

is established among the pitch P of unevenness in the transmissivity of the diffuser 6a, the substantial numerical aperture NAin of the light integrator 3a, and the distance L between the diffuser 6a and the spatial light modulator 7a.

Further, in order to use the diffuser 6a more effectively, the distance L between the diffuser 6a and the spatial light modulator 7a should be set so that a relationship, $$P/NAin<L<D/(3\times(\theta/2+NAin)) \quad (5)$$

is established, according to formula (3) and formula (4) mentioned above.

The pitch P of unevenness in the transmissivity of the ordinary diffuser is less than ten times the granularity d of the diffuser 6a. Therefore, for example, when using a illumination optical system including a light integrator 3a having a numerical aperture of 0.1, a distance ranging from several hundreds of micrometers to ten millimeters should be secured between the diffuser 6a and the spatial light modulator 7a if the granularity of the diffuser 6a ranges from five micrometers to hundred micrometers.

The distance between the diffuser 6b and the spatial light modulator 7b and the distance between the diffuser 6c and the spatial light modulator 7c are set in like manner as described for the distance between the diffuser 6a and the spatial light modulator 7a.

As described above, according to the first embodiment, there are provided the laser sources 1a~1c corresponding to RGB primary colors, the diffusers 6a~6c for diffusing light, the illumination optical systems for irradiating the diffusers with the light beams emitted from the laser sources 1, the diffuser vibration units 13a~13c for vibrating the diffusers 6a~6c, and the spatial light modulators 7a~7c for modulating the light beams that are emitted from the laser sources 1a~1c and diffused by the diffusers 6a~6c, the spatial light modulators 7a~7c being disposed near the diffusers 6a~6c, respectively, and the operating conditions for vibrating the diffusers 6a~6c and the like are defined, whereby bright and high-quality image display without noise can be realized.

That is, since, in this first embodiment, the vibration velocities of the diffusers 6a~6c are determined so that a relationship of V>d×30 (millimeters/sec) is established between the grain size d of the diffusers and the velocity V at which the diffusers are vibrated, the speckle noise existing on the image projected onto the screen 11 can be effectively reduced.

Further, in this first embodiment, since the diffusion angle θ of the diffusers 6a~6c is determined on the basis of the substantial numerical aperture NAin of the illumination optical system, and the brightness f of the projector lens 10, an appropriate relationship is realized among the diffusion angle of the diffusers, the substantial numerical aperture of the illumination optical system, and the brightness of the projector lens, thereby avoiding loss of light quantity due to vignetting caused by the projector lens, resulting in bright image display.

Further, in this first embodiment, the distance L between the spatial light modulators 7a~7c and the diffusers 6a~6c, respectively, is determined on the basis of the diffusion angle θ of the diffuser, the substantial numerical aperture NAin of the illumination optical system, and the screen size D of the spatial light modulator in the diagonal direction. Therefore, an appropriate relationship is realized among the diffusion angle of the diffuser, the substantial numerical aperture of the illumination optical system, and the screen size of the spatial light modulator in the diagonal direction, whereby the light is prevented from being scattered by the diffuser to the outside of the image display part of the spatial light modulator, resulting in a reduction in loss of total light quantity in the light transmission path from the laser source to the screen.

Further, in this first embodiment, the distance L between the spatial light modulators 7a~7c and the diffusers 6a~6c, respectively, is determined on the basis of the pitch of unevenness in the transmissivity of the diffuser, and the substantial numerical aperture NAin of the illumination optical system. Therefore, an appropriate relationship is realized among the diffusion angle of the diffuser, the pitch of unevenness in the transmissivity of the diffuser, the substantial numerical aperture of the illumination optical system, and the distance between the diffuser and the spatial light modulator, thereby avoiding degradation in the image due to local unevenness in the transmissivity of the diffuser, resulting in high-quality image display.

Further, in this first embodiment, since the illumination optical system includes the light integrator, uniform illumination over the spatial light modulator is realized.

EMBODIMENT 2

Figure 4A:
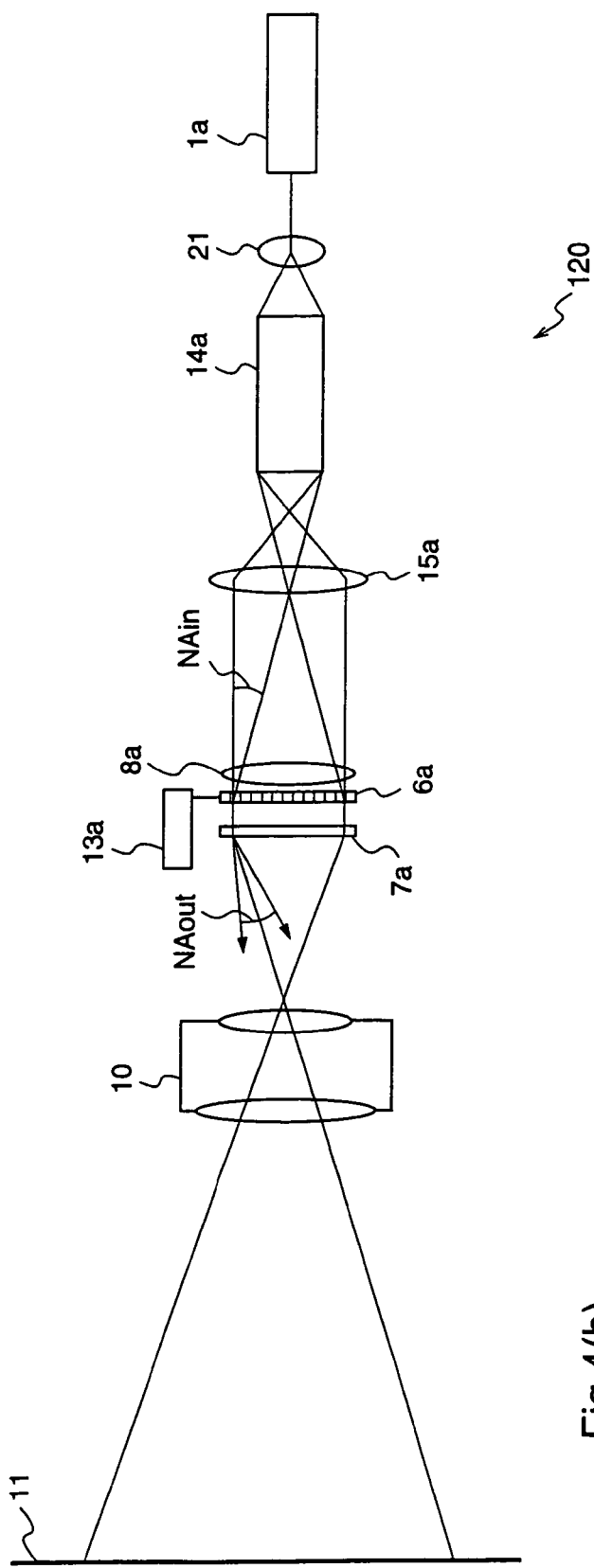
FIG. 4(a) is a diagram illustrating a numerical aperture of illumination light, and a numerical aperture of emission light from a spatial light modulator, in a two-dimensional image formation apparatus according to a second embodiment of the present invention.
Figure 4B:
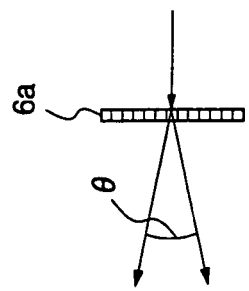
FIG. 4(b) is a diagram illustrating a diffusion angle of a diffuser in the two-dimensional image formation apparatus according to the second embodiment.

FIGS. 4(a) and 4(b) are diagrams for explaining a two-dimensional image formation apparatus according to a second embodiment of the present invention. FIG. 4(a) shows a numerical aperture NAin of illumination light, and a numerical aperture NAout of an emitted light from the spatial light modulator 7a, and FIG. 4(b) shows a diffusion angle $\theta$ of the diffuser 6a. In the figures, the same or corresponding constituents as those shown in FIG. 3 are given the same reference numerals, and description thereof will be omitted.

An illumination optical system corresponding to the red laser source 1a of the two-dimensional image formation apparatus 120 according to the second embodiment has a rod type light integrator 14a and a projector lens 15a, instead of the light integrator 3a and the condenser lens 12a of the illumination optical system corresponding to the red laser source 1a of the two-dimensional image formation apparatus 110 according to the first embodiment.

The rod type light integrator 14a is a transparent medium comprising glass or the like and having a rectangular cross-section, and a reflection plane for reflecting light that is provided in the light integrator 14a, whereby the rod type light integrator 14a internally reflects the light enlarged by the magnifying lens 21, and emits the light from the emission-side end surface so that the intensity distribution of the emitted light becomes uniform.

The projection lens 15a projects the light from the rod type light integrator 14a on the spatial light modulator 7 so that the emission-side end surface of the light integrator 14a one-to-one corresponds to the image display part of the spatial light modulator 7a.

Although it is not shown, the illumination optical systems corresponding to the green laser source 1b and the blue laser source 1c of the two-dimensional image formation apparatus 120 according to the second embodiment respectively have rod type light integrators and projection lenses, instead of the light integrators 3b and 3c and the condenser lenses 12b and 12c of the illumination optical systems corresponding to the green laser source 1b and the blue laser source 1c of the two-dimensional image formation apparatus 110 according to the first embodiment.

Next, the operation will be described.

Also in the two-dimensional image formation apparatus 120 according to the second embodiment, like the two-dimensional image formation apparatus 110 according to the first embodiment, the light beams emitted from the red laser source, the green laser source, and the blue laser source are incident on the diffusers through the corresponding illumination optical systems to be diffused by the diffusers. The spatial light modulators are illuminated by the laser beams diffused by the diffusers, and two-dimensional images are formed on the respective spatial light modulators. The light beams that have passed through the respective spatial light modulators are multiplexed by the dichroic prism, and the multiplexed light is projected on the screen by the projector lens.

In the illumination optical system corresponding to the red laser source 1a, the light beam emitted from the laser source 1a is incident on the rod type light integrator 14a through the magnifying lens 21, repeats internal reflection in the rod type light integrator 14a, and is emitted so that it has uniform light intensity distribution at the emission-side end surface. The emitted light is projected on the spatial light modulator 7a by the projector lens 15a so that the emission-side end surface one-to-one corresponds to the image display part of the spatial light modulator 7a. Thereby, the light that illuminates the spatial light modulator 7a has uniform distribution of light intensity.

In the illumination optical system corresponding to the green laser source, in contrast to the illumination optical system corresponding to the red laser source 1a, the light that is condensed by the condenser lens 12b is directly incident on the field lens 8a as shown in FIG. 1. In the illumination optical system corresponding to the blue laser source 1c, the light that is emitted from the laser source 1c is led to the diffuser 6c in the same manner as described for the illumination optical system corresponding to the red laser source 1a.

According to the second embodiment, since the operating conditions for vibrating the diffusers 6a~6c and the like are defined, bright and high-quality image display without noise is realized.

Further, in this second embodiment, the illumination optical system includes the rod type light integrator having a rectangular cross-section and comprising a transparent medium such as glass, in place of the light integrator comprising two two-dimensional lens arrays 4 and 5 according to the first embodiment. Therefore, uniform illumination over the spatial light modulator is realized by the simple construction.

EMBODIMENT 3

Figure 5:
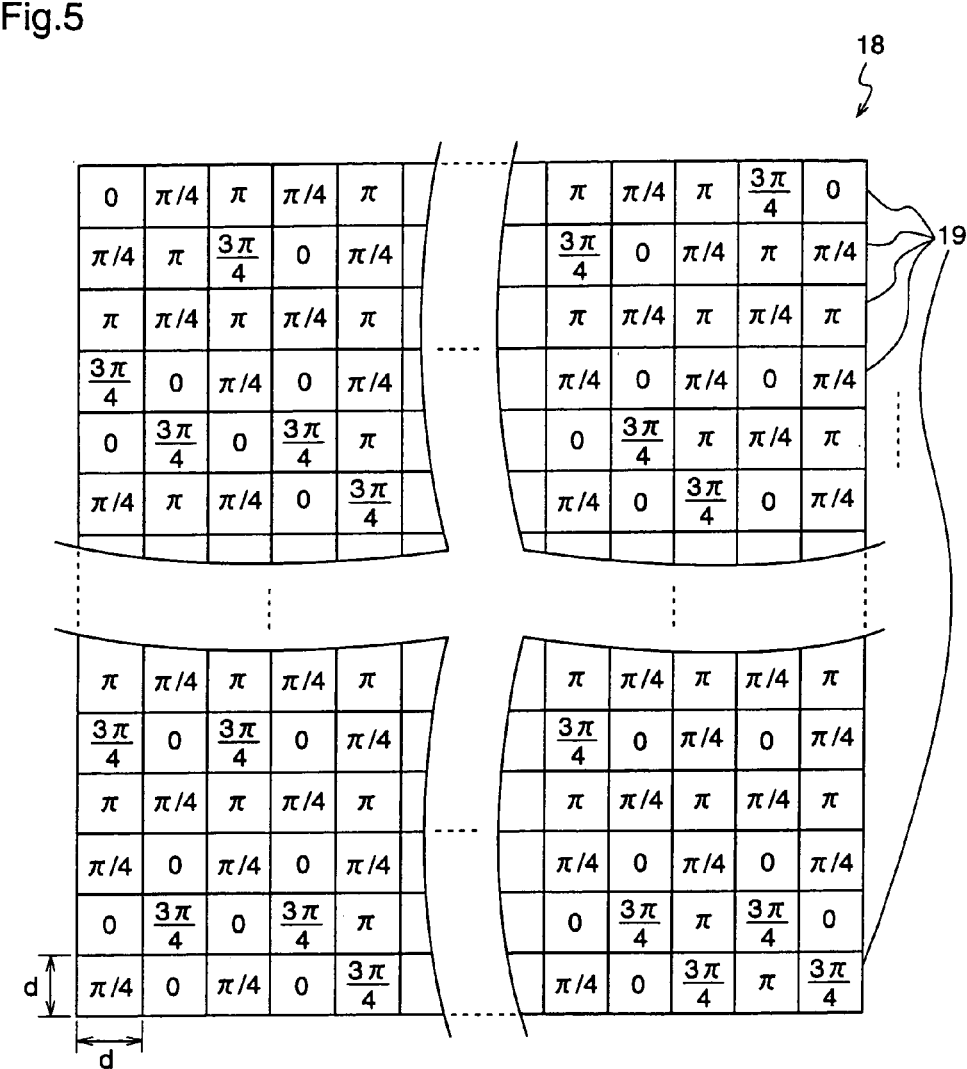
FIG. 5 is a diagram for explaining a two-dimensional image formation apparatus according to a third embodiment of the present invention, illustrating a pseudo random diffuser used in the two-dimensional image formation apparatus.

FIG. 5 is a diagram for explaining a two-dimensional image formation apparatus according to a third embodiment of the present invention, illustrating a diffuser as a constituent of the two-dimensional image formation apparatus.

This third embodiment is different from the first and second embodiments in that the third embodiment employs a pseudo random diffuser 18 having a regular concave-convex configuration at its surface while the first and second embodiments employ a frosted glass diffuser having a random concave-convex configuration at its surface.

The diffuser according to the first and second embodiments is usually fabricated by randomly roughening the surface of a transparent substrate such as glass or plastic. On the other hand, the pseudo random diffuser 18 according to the third embodiment is fabricated so as to form a concave-convex configuration at its surface, by partitioning the surface of a transparent substrate in a reticular pattern, and processing the partitioned small areas such that the height of each small area becomes different from the heights of adjacent small areas. More specifically, the surface of the pseudo random diffuser 18 is divided into two-dimensional lattice-shaped cells, and the heights of the respective cells are randomly determined so that the phases of the light beams passing through the respective cells randomly vary. The maximum depth d of the concave-convex configuration is obtained when the difference in phases between the light beams passing through the concave portion and the convex portion becomes $\lambda$, and a relational expression, $d \times (n-1) = \lambda$, is established because the refractive index of the diffuser is n and the refractive index of air is 1. Accordingly, the maximum depth d of the concave-convex configuration is $\lambda/(n-1)$.

Next, the function and effect will be described.

The two-dimensional image formation apparatus according to the third embodiment is different from the two-dimensional image formation apparatuses according to the first and second embodiments only in that the pseudo random diffuser is employed, and therefore, the advantage of using the pseudo random diffuser will be described hereinafter.

To be specific, the advantage of using the pseudo random diffuser 18 shown in FIG. 5 is that the diffusion angle of the light passing through the pseudo random diffuser 18 can be exactly controlled according to the sizes of the cells. That is, the light passing through the pseudo random diffuser 18 is diffused with the intensity distribution shown by formula (6) as follows, $$I(\theta)=\{\sin(\alpha)/\alpha\}^2(\alpha=\theta \times dc/(\pi \cdot \lambda)) \quad (6)$$

wherein dc is the cell pitch of the lattice-shaped cells, and θ is the diffusion angle.

For example, in order to fabricate a pseudo random diffuser 18 in which the half-value full angle of the diffusion angle of the diffuser 18 is 10°, ½ and 10·(2π/360) are substituted for I(θ) and θ in formula (6), respectively. When using laser sources with the optical wavelengths λ of blue, green, and red being 0.473, 0.532, and 0.640 micrometers, respectively, the cell pitches dc of the diffusers to be fabricated should be 2.4, 2.7, and 3.2 micrometers, respectively.

As a method for fabricating the pseudo random diffuser 18, it is possible to employ a method of forming a concave-concave pattern on a glass plate by photolithography and etching which are used in an ordinary semiconductor process. At this time, as shown in FIG. 5, the depths of the lattice-shaped cells are set to the depths equivalent to the phase shifts of 0, π/4, λ/2, 3π/4, whereby the pseudo random diffuser 18 can be easily fabricated by subjecting the glass plate to two times of etching processes, i.e., an etching process of etching the glass plate to a depth equivalent to π/4 phase shift, and an etching process of etching the glass plate to a depth equivalent to π/2 phase shift.

Since the diffuser is fabricated as mentioned above, it is possible to solve the problems which are caused by the random surface configuration of the ordinary diffuser.

To be specific, the pseudo random diffuser 18 shown in FIG. 5 is able to solve the problems as follows: 1) the local diffusion angle differs according to location, whereby the light use efficiency is reduced, 2) the transmissivity varies according to location, whereby uneven distribution of intensity occurs in the image, 3) it is difficult to fabricate a diffuser having a constant diffusion angle, 4) the deflection direction is distorted when. the diffusion angle is large.

As described above, according to the third embodiment, since the pseudo random diffuser 18 is employed as a diffuser, uniform diffusion angle and uniform transmissivity are realized, resulting in brighter image display with less noise.

Further, in this third embodiment, since the cell areas which are partitioned in a lattice pattern at the surface of the pseudo random diffuser 18 are processed such that adjacent cell areas have different heights, the diffusion angle of the light passing through the diffuser 18 can be exactly controlled according to the cell sizes, whereby the light use efficiency can be improved.

Further, in this third embodiment, since a difference in heights between adjacent cell areas at the surface of the pseudo random diffuser 18 is determined so that the phases of the light beams passing through these cell areas are π/4 shifted from each other, a diffuser can be stably fabricated so as to have a constant diffusion angle, whereby the light use efficiency can be improved.

EMBODIMENT 4

Figure 6A:
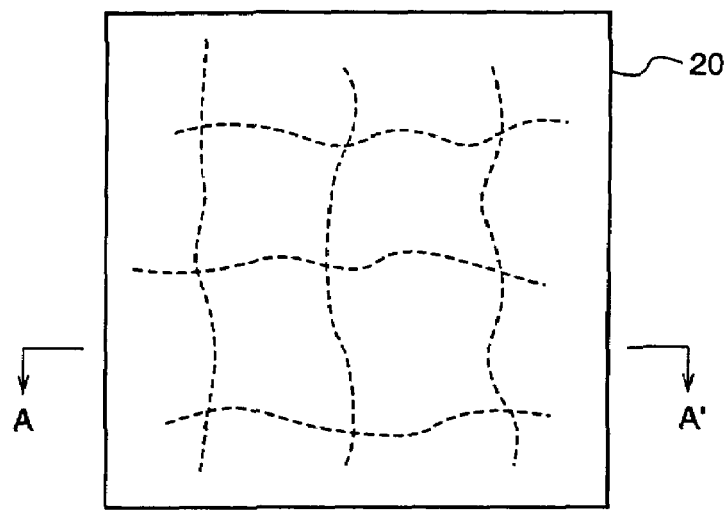
FIG. 6(a) is a diagram for explaining a two-dimensional image formation apparatus according to a fourth embodiment of the present invention, showing a plan view for explaining a pseudo random diffuser used in the two-dimensional image formation apparatus according to the fourth embodiment.
Figure 6B:
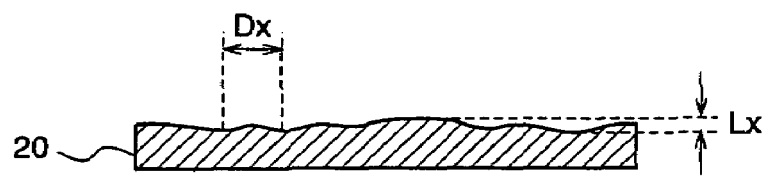
FIG. 6(b) is a cross-sectional view for explaining the pseudo random diffuser used in the two-dimensional image formation apparatus according to the fourth embodiment.
Figure 7:
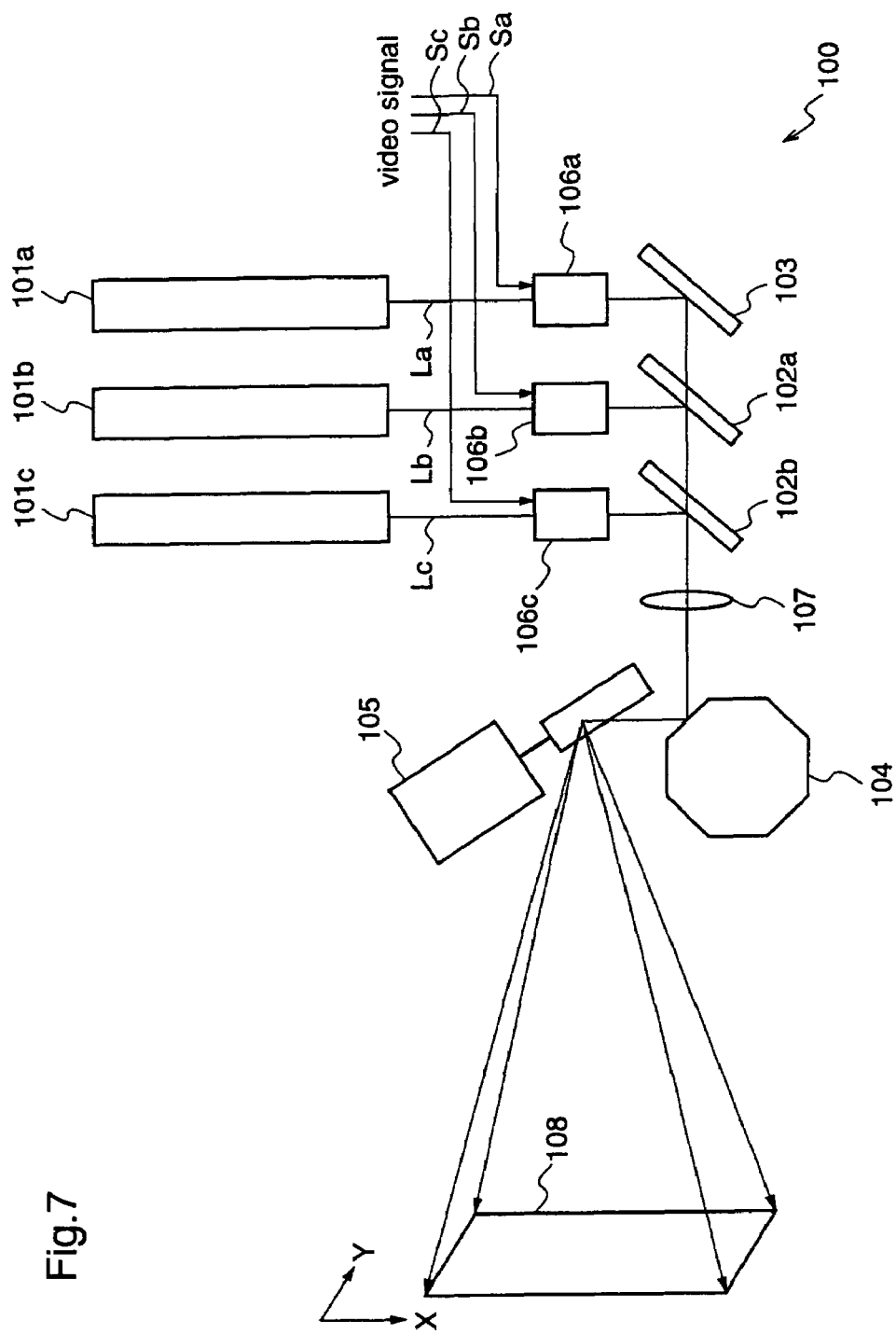
FIG. 7 is a schematic block diagram illustrating a conventional two-dimensional image formation apparatus.

FIGS. 6(a) and 6(b) are diagrams for explaining a two-dimensional image formation apparatus according to a fourth embodiment of the present invention. FIG. 6(a) is a plan view illustrating a diffuser as a component of the two-dimensional image formation apparatus, and FIG. 6(b) is a cross-sectional view taken along a line A-A' in FIG. 6(a).

The two-dimensional image formation apparatus according to the fourth embodiment employs a pseudo random diffuser 20 having a configuration in which concave-convex variations at the surface are smooth, instead of the pseudo random diffuser 18 of the two-dimensional image formation apparatus according to the third embodiment.

Next, the function and effect will be described.

The two-dimensional image formation apparatus according to the fourth embodiment is different from the third embodiment only in that it employs the pseudo random diffuser 20 having a surface configuration different from that of the diffuser of the two-dimensional image formation apparatus according to the third embodiment, and therefore, only the advantage of using this pseudo random diffuser 20 will be described hereinafter.

In the pseudo random diffuser 20 shown in FIG. 6, there occurs no high-order diffracted light which is scattered at a large angle that is caused by a difference in levels between adjacent concave and convex at the surface of the diffuser, whereby the light use efficiency is improved.

The diffraction angle of the diffracted light depends on the size d of the granularity of the concave-convex configuration. The diffraction angle becomes smaller when the granularity size d is larger, and the diffraction angle becomes larger when the granularity size d is smaller. In this fourth embodiment, the diffraction angle can be kept under a predetermined degree by setting the granularity size d to a predetermined size or smaller. As a result, there is no light beam exceeding the f value of the projector lens 10, resulting in improved light use efficiency.

A method for fabricating the pseudo random diffuser 20 having a smoothly changing concave-convex configuration is as follows. Initially, the surface of a glass substrate is processed so as to have a step configuration with random in-plane distribution, i.e., so as to have a surface configuration in which steps are randomly distributed.

To be specific, a photoresist is spin-coated on the surface of the glass substrate, and a resist pattern having random in-plane distribution is formed by photolithography. Then, the formed resist pattern is transcribed to the surface configuration of the glass plate by a method such as ion beam etching or wet etching. The surface of the glass substrate thus fabricated has a step configuration in which concave and convex are randomly distributed.

Next, the surface of the glass substrate is polished so as to smooth the concave-convex variations at the surface. At this time, a soft material such as a buff is used as a polishing plate, whereby the step configuration at the surface of the substrate where concave portions and convex portions are randomly distributed is processed to be a configuration where variations in levels of the concave and convex portions at the surface are smoothed, as shown in FIG. 6(b). The depth of the concave portion at the substrate surface decreases during the polishing. Therefore, in order to obtain a desired depth Dx of the concave portion, the depth of the concave portion at the substrate surface to be fabricated by etching should be 2~3 times as large as the desired depth Dx of the concave portion.

As described above, according to the fourth embodiment, since the pseudo random diffuser 20 having a surface configuration in which concave-convex variations at the surface are smooth is used as a diffuser, it is possible to avoid occurrence of high-order diffracted light which is scattered at a large angle that is caused by a difference in levels between adjacent concave and convex at the surface of the diffuser, whereby loss of light intensity due to vignetting caused by the projector lens 10 is avoided, resulting in improved light use efficiency.

While in the above description a color image projection device is taken as an example, the present invention is also applicable to an image projection device using a mono-color laser, such as a semiconductor exposure device.

Further, while in the above-mentioned respective embodiments the two-dimensional image formation apparatus is a projection type display in which a projection optical system and a screen are separated from each other, it may be a rear-projection type two-dimensional image formation apparatus in which a projection optical system and a transparent screen are combined.

APPLICABILITY IN INDUSTRY

A two-dimensional image formation apparatus according to the present invention enables bright and high-quality image display with no noise, and it is useful in an image display apparatus such as a television receiver or a video projector, or an image formation apparatus such as a semiconductor exposure device.

The invention claimed is:

1. An apparatus for forming a two-dimensional image by light modulation, comprising:
   a coherent light source;
   a diffuser for diffusing light;
   an illumination optical system for irradiating the diffuser with light emitted from the coherent light source;
   a diffuser vibration unit for vibrating the diffuser; and
   a spatial light modulator disposed near the diffuser, said modulator modulating the light that is emitted from the coherent light source and diffused by the diffuser;
   wherein said diffuser vibration unit vibrates the diffuser at a velocity that satisfies an expression, $V > d \times 30$ (millimeters/sec)

which is established between the grain size d of the diffuser and the velocity V for vibrating the diffuser.

2. An apparatus for forming a two-dimensional image by light modulation, comprising:
   a coherent light source;
   a diffuser for diffusing light;
   an illumination optical system for irradiating the diffuser with light emitted from the coherent light source;
   a spatial light modulator disposed near the diffuser, said modulator modulating the light that is emitted from the coherent light source and diffused by the diffuser; and
   a projector lens for projecting an image which is obtained by light modulation by the spatial light modulator, on a certain plane in space;
   wherein a diffusion angle θ of the diffuser, a substantial numerical aperture NAin of the illumination optical system, and a brightness f of the projector lens satisfy an expression, $\theta/2 \operatorname{Sin}^{-1}(NAin) < 2 \times \operatorname{Tan}^{-1}(1/2f)$.

3. An apparatus for forming a two-dimensional image by light modulation, comprising:
   a coherent light source;
   a diffuser for diffusing light;
   an illumination optical system for irradiating the diffuser with light emitted from the coherent light source;
   a spatial light modulator disposed near the diffuser, said modulator modulating the light that is emitted from the coherent light source and diffused by the diffuser; and
   a projector lens for projecting an image that is obtained by light modulation by the spatial light modulator, on a certain plane in space;
   wherein a distance L between the spatial light modulator and the diffuser, a diffusion angle θ of the diffuser, a substantial numerical aperture NAin of the illumination optical system, and a screen size D of the spatial light modulator in a diagonal direction satisfy an expression, $(\theta/2 + \operatorname{Sin}^{-1}(NAin)) \times L < D/3$.

4. An apparatus for forming a two-dimensional image by light modulation, comprising:
   a coherent light source;
   a diffuser for diffusing light;
   an illumination optical system for irradiating the diffuser with light emitted from the coherent light source;
   a spatial light modulator disposed near the diffuser, said modulator modulating the light that is emitted from the coherent light source and diffused by the diffuser; and
   a projector lens for projecting an image of the spatial light modulator on a certain plane in space;
   wherein the spatial light modulator and the diffuser are separated from each other by a distance that is determined on the basis of a pitch of unevenness in the transmissivity of the diffuser, and a substantial numerical aperture of the illumination optical system.

5. A two-dimensional image formation apparatus as defined in claim 4 wherein a relationship, $L \times NAin > P$ is established among the pitch P of unevenness in the transmissivity of the diffuser, the substantial numerical aperture NAin of the illumination optical system, and the distance L between the spatial light modulator and the diffuser.

6. A two-dimensional image formation apparatus as defined in claim 1 wherein said illumination optical system includes a light integrator.

7. A two-dimensional image formation apparatus as defined in claim 6 wherein said light integrator comprises at least two lens arrays.

8. A two-dimensional image formation apparatus as defined in claim 2 wherein said illumination optical system includes a light integrator.

9. A two-dimensional image formation apparatus as defined in claim 8 wherein said light integrator comprises at least two lens arrays.

10. A two-dimensional image formation apparatus as defined in claim 3 wherein said illumination optical system includes a light integrator.

11. A two-dimensional image formation apparatus as defined in claim 10 wherein said light integrator comprises at least two lens arrays.

12. A two-dimensional image formation apparatus as defined in claim 4 wherein said illumination optical system includes a light integrator.

13. A two-dimensional image formation apparatus as defined in claim 12 wherein said light integrator comprises at least two lens arrays.

* * * * *